US005905961A

United States Patent [19]
Sanders, III et al.

[11] Patent Number: 5,905,961
[45] Date of Patent: May 18, 1999

[54] METHOD AND APPARATUS FOR MANAGING REMOTE UNIT INCREASED POWER TRANSMISSION DURING LOCATION

[75] Inventors: Stephen H. Sanders, III, Chicago; Jay P. Jayapalan, Buffalo Grove, both of Ill.

[73] Assignee: Motorola, Inc., Schaumburg, Ill.

[21] Appl. No.: 08/795,528

[22] Filed: Feb. 5, 1997

[51] Int. Cl.$^6$ ........................................ H04Q 7/34
[52] U.S. Cl. ................ 455/456; 455/456; 455/522; 342/451; 701/200
[58] Field of Search .................... 455/456, 457, 455/500, 507, 524, 522, 571, 572, 67.1, 423, 425; 201/200, 207; 342/450, 451

[56] References Cited

U.S. PATENT DOCUMENTS

| | | | |
|---|---|---|---|
| 3,886,554 | 5/1975 | Braun et al. . | |
| 4,481,670 | 11/1984 | Freeburg . | |
| 4,670,906 | 6/1987 | Thro . | |
| 4,736,453 | 4/1988 | Schloemer . | |
| 5,175,870 | 12/1992 | Mabey et al. | 455/67.1 |
| 5,327,575 | 7/1994 | Menich et al. | 455/437 |
| 5,508,708 | 4/1996 | Ghosh et al. | 342/457 |
| 5,583,517 | 12/1996 | Yokev et al. . | |
| 5,613,205 | 3/1997 | Dufour | 455/440 |
| 5,675,344 | 10/1997 | Tong et al. | 455/456 |
| 5,732,354 | 3/1998 | MacDonald | 455/456 |
| 5,787,354 | 7/1998 | Gray et al. | 455/456 |

*Primary Examiner*—Dwayne D. Bost
*Assistant Examiner*—Alan Gantt
*Attorney, Agent, or Firm*—Kenneth A. Haas

[57] ABSTRACT

Remote units (113) that require locating are managed by a queue controller (180) such that the number and location of remote units (113) that are transmitting at increased power at any given time is limited. In particular, a queue controller (180) places identification information for remote units (113) requiring location onto queues (203) associated with base stations supplying reference pilots to the remote units (113). Additionally, identification (ID) information for the remote units (113) requiring location is placed onto queues (203) associated with base stations neighboring the base stations supplying the reference pilot to the remote units (113). The queues (203) operate on a first-in-first-out (FIFO) basis, that output remote unit ID at periodic intervals. Once all queues (203) have been emptied of the ID of a particular remote unit (113), location takes place for that remote unit (113).

18 Claims, 4 Drawing Sheets

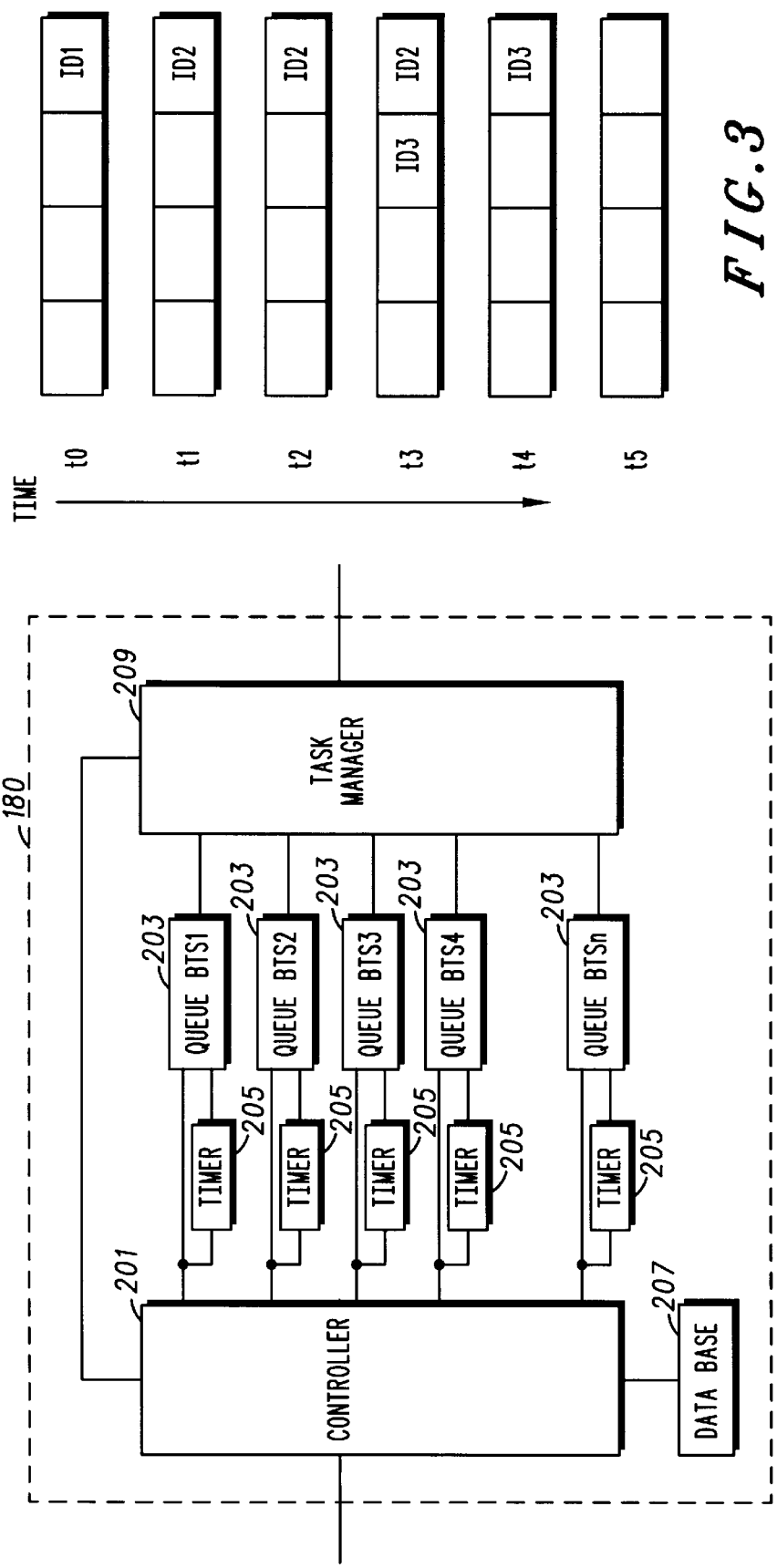

METHOD AND APPARATUS FOR MANAGING REMOTE UNIT INCREASED POWER TRANSMISSION DURING LOCATION

FIELD OF THE INVENTION

The present invention relates generally to wireless communication systems and, in particular, to managing increased power transmissions of a remote unit during location.

BACKGROUND OF THE INVENTION

It is well known that a remote unit's location within a wireless communication system may be determined using a trilateration method. According to such a method, distances between the remote unit and multiple base stations are calculated based on the measurement of a time delay of a signal traveling between the remote unit and each base station. Such a prior-art method for calculating a remote unit's location is described in U.S. Pat. No. 5,508,708 "Method and Apparatus for Location Finding in a CDMA System" by Ghosh et al. and incorporated by reference herein. As described in U.S. Pat. No. 5,508,708, when location of a remote unit is desired, the remote unit may be instructed to increase the power at which it transmits to ensure that a sufficient amount of base stations are able to decode the remote unit's transmission.

Although increasing a remote unit's transmit power will serve to increase the number of base stations that the remote unit is in communication with, during the time that the remote unit is transmitting at increased power levels, other remote units operating in the same geographic area will be negatively affected since the increased transmit power will be generating additional system interference. In a commercial setting, where there can be many remote units requiring simultaneous location estimates, the simultaneous increase in transmit power for all remote units requiring location estimates can cause unacceptably high frame error rates (FERs), resulting in increased dropped call rates as well as reducing the ability of the wireless communication system to determine the location of the remote units. Thus a need exists for a method and apparatus for managing the increased power transmission of a remote unit during location.

BRIEF DESCRIPTION OF THE DRAWINGS

FIG. 2 is a block diagram of the queue controller of FIG. 1 in accordance with the preferred embodiment of the present invention.

FIG. 3 illustrates operation of the queue of FIG. 2 in accordance with a preferred embodiment of the present invention.

DETAILED DESCRIPTION OF THE DRAWINGS

Figure 1:
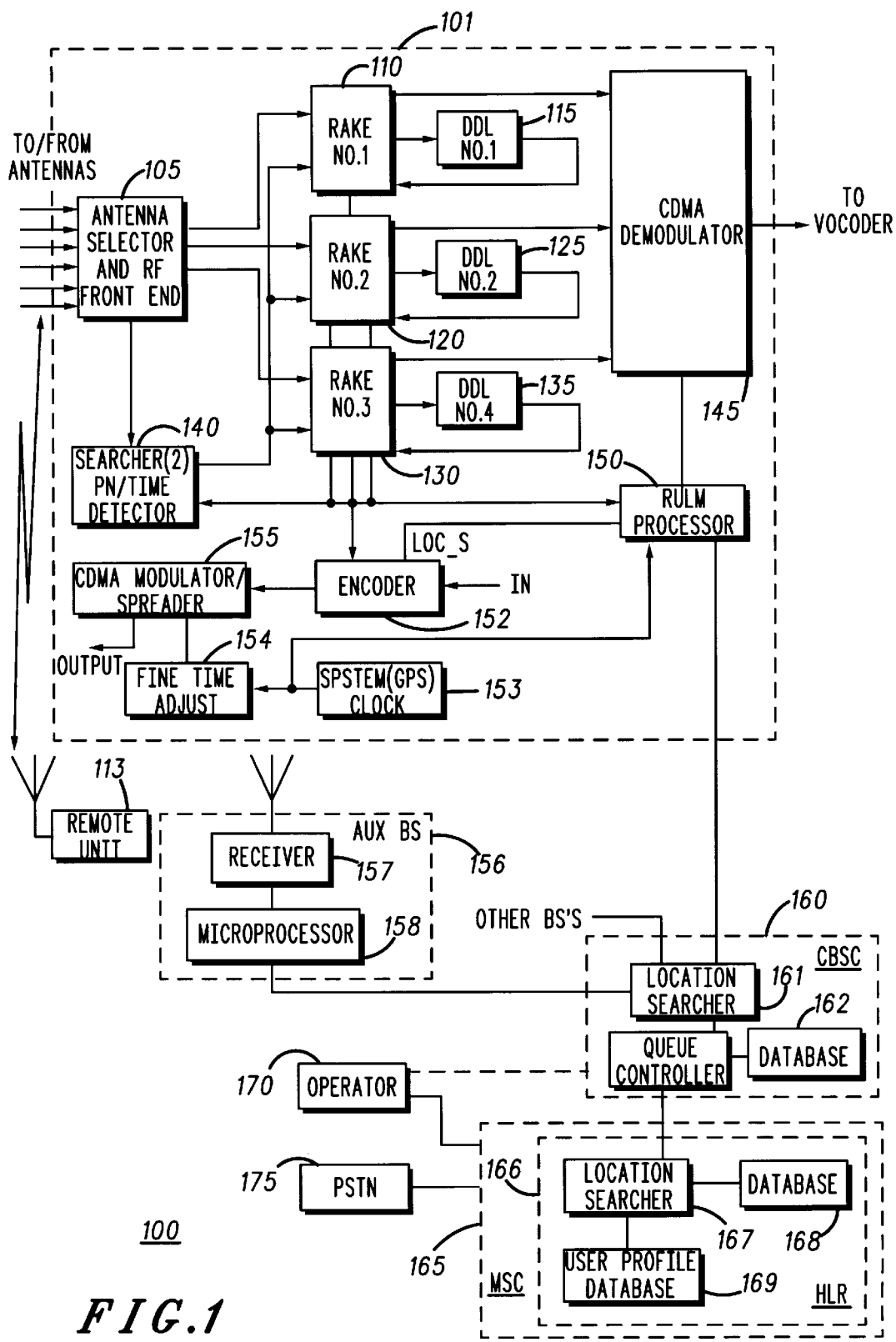
FIG. 1 is a block diagram showing a wireless communication system in accordance with the preferred embodiment of the present invention.

Stated generally, remote units that require locating are managed by a queue controller such that the number and location of remote units that are transmitting at increased power at any given time is limited. In particular, a queue controller places identification information for remote units requiring location onto queues associated with base stations supplying reference pilots to the remote units. Additionally, identification information for the remote units requiring location is placed onto queues associated with base stations neighboring the base stations supplying the reference pilot to the remote units. The queues operate on a first-in-first-out (FIFO) basis, that output a remote unit identification at periodic intervals. Once all queues have been emptied of the identification of a particular remote unit, location takes place for that remote unit.

The present invention encompasses a method for locating a remote unit. The method comprises the steps of determining a first base station and a second base station currently serving the remote unit and placing identification information regarding the remote unit onto a first buffer associated with the first base station. Identification information regarding the remote unit is also placed onto a second buffer associated with the second base station. The identification information is removed from the first buffer at a first time and from the second buffer at a second time. Finally, the remote unit is located only after information regarding the remote unit has been removed from the first and the second buffers.

An alternate embodiment of the present invention encompasses a method for managing a location estimation of a first remote and a second remote unit. The method comprises the steps of placing identification information regarding the first and the second remote unit onto a buffer and removing the identification information regarding the first remote unit from the buffer. After the identification information regarding the first remote unit is removed from the buffer, the first remote unit is located and the buffer is locked for a predetermined amount of time so that the identification information regarding the second remote unit cannot be removed from the buffer until the predetermined amount of time has passed. After the predetermined amount of time has passed the identification information regarding the second remote unit is removed from the buffer and the second remote unit is located.

Yet another embodiment of the present invention encompasses a method for locating a remote unit. The method comprises the steps of determining a first base station and a second base station currently serving the remote unit and determining if locating the remote unit will negatively affect remote units served by the second base station. Information regarding the remote unit is placed onto a first buffer associated with the first base station. If it is determined that locating the remote unit will negatively affect remote units served by the second base station then identification information regarding the remote unit is placed onto a second buffer associated with the second base station. Next, the identification information is removed from the first buffer at a first time and only removed from the second buffer if locating the remote unit will negatively affect remote units served by the second base station. Finally the remote unit is located after identification information regarding the remote unit does not exist on the first and the second buffer.

A final embodiment of the present invention encompasses an apparatus comprising a controller for determining a first base station and a second base station currently serving a remote unit, a first buffer associated with the first base station, a second buffer associated with the second base station, and a timer for removing identification information from the first buffer at a first time and removing identification information from the second buffer at a second time. Finally locating equipment is provided coupled to the first and the second buffers.

FIG. 1 is a block diagram showing wireless communication system 100 in accordance with the preferred embodiment of the present invention. Wireless communication system 100 is preferably a cellular communication system that utilizes a Code Division Multiple Access (CDMA) system protocol, however, in alternate embodiments of the present invention communication system 100 may utilize any analog or digital system protocol such as, but not limited to, the Advanced Mobile Phone Service (AMPS) protocol, the Global System for Mobile Communications (GSM) protocol, the Personal Digital Cellular (PDC) protocol, or the United States Digital Cellular (USDC) protocol. Communication system 100 comprises remote unit 113, wireless infrastructure equipment, including auxiliary base station 156, Centralized Base Station Controller (CBSC) 160, Mobile Switching Center (MSC) 165, Home Location Register (HLR) 166, and base station 101. Base station 101 has common RF front end 105 which feeds independent rake inputs 110, 120, and 130. A communication system utilizing the CDMA system protocol is described in detail in Cellular System Remote unit-Base Station Compatibility Standard of the Electronic Industry Association/Telecommunications Industry Association Interim Standard 95 (IS-95-A) which is incorporated by reference herein. (EIA/TIA can be contacted at 2001 Pennsylvania Ave. NW Washington D.C. 20006).

Operation of Communication system 100 in accordance with the preferred embodiment of the present invention occurs as follows: To initiate a location request, a command is originated at a regional entity such as MSC 165, operations center 170, or perhaps within a connected network such as Public Switched Telephone Network (PSTN) 175. The location request, which includes identification information on the remote unit that is to be located enters HLR 166 where it is processed to determine the currently serving base station. Once the currently serving base station is known, the location request is passed to queue controller 180. Although in the preferred embodiment of the present invention HLR 166 passes the location request to queue controller 180, in alternate embodiments of the present invention the queue controller may receive the location request along with the remote unit ID and serving base station from any of a number of different network elements depending on the implementation architecture of the system. In the preferred embodiment of the present invention, queue controller 180 manages the number and location of all location requests such that the number and location of remote units that are transmitting at increased power at any given time is limited. In particular, queue controller 180 determines an appropriate time to increase transmit power for each remote unit requiring location such that system interference is reduced by limiting the simultaneous increase in transmit power for multiple remote units requiring location. (Further details regarding operation of queue controller 180 will be discussed below). By limiting the number of remote units simultaneously transmitting at increased power levels and thereby reducing system interference, unacceptably high system frame erasure rates can be reduced, resulting in decreased dropped call rates. In addition, interference between multiple remote units requiring location is also reduced, resulting in an increased ability to accurately determine the location of the remote units.

Continuing, at an appropriate time, the location request is passed from queue controller 180 to the base station providing remote unit 113 with a reference pilot (reference-pilot base station) and those base stations neighboring the reference-pilot base station (the group of base stations comprising the reference-pilot base station and base stations neighboring the reference-pilot base station hereinafter is referred to as the group of serving base stations), where processor 150 of base station 101 (and similar processors of other serving base stations) calculate a time delay of a signal traveling between the remote unit and each base station. This may be accomplished as described in U.S. Pat. No. 5,508,708 by all bases determining the leading edge rise time of a specified group of PN chips, for example by determining the rise time for each 64th chip (i.e., PN sequence number 0, 64, 128, etc.) for a predetermined number of chips, or may be accomplished via other location methods (e.g., as described in U.S. Pat. No. 5,583,517 "Multi-Path Resistant Frequency-Hopped Spread Spectrum Mobile Location system", or as described in U.S. Pat. No. 3,886,554 "Method and Apparatus for Improving the Accuracy of a Vehicle Location System"). Location information is then forwarded by each base station 101, along with its base station identification, to locating equipment such as location searcher 161 of BSC 160, or location searcher 167 of HLR 166, etc., where remote unit location is determined Thus, the distances between the remote unit and multiple base stations are calculated based on the measurement of a time delay of a signal traveling between the remote unit and each base station.

FIG. 2 is a block diagram showing queue controller 180 of FIG. 1 in accordance with the preferred embodiment of the present invention. Queue controller 180 comprises controller 201, database 207, task manager 209, and multiple queues 203 each having an associated timer 205. In the preferred embodiment of the present invention, each base station within communication system 100 has an associated queue 203 and timer 205, but in an alternate embodiments of the present invention, queues 203 and timers 205 may be distributed differently (e.g., each base station sector within communication system 100 may have an associated queue 203 and timer 205).

Operation of queue controller 180 occurs as follows: Controller 201 receives a remote unit location request from HLR 166, which contains the identification of remote unit 113 and the reference-pilot base station. Controller 201 accesses database 207 and determines all base stations neighboring the reference-pilot base station. Once the serving stations have been determined, identification information for remote unit 113 (remote unit ID) is placed onto those queues 203 associated with each serving base station. Additionally, task manager 209 is supplied with the remote unit ID and a number corresponding to the number of serving base stations. Queues 203 are similar to buffers operating on a first-in-first-out (FIFO) basis, that output a remote unit ID at periodic intervals. In the preferred embodiment of the present invention, timer 205 controls queue 203 such that queue 203 will be prevented from outputting a remote unit ID for a programmable time (based on system activity, quality of service required by a service provider, and call quality measurements) after outputting a remote unit ID. (Further details on queue 203 are discussed below in reference to FIG. 3).

Continuing, as discussed above, task manager 209 receives remote unit ID information and the number of serving base stations from controller 201. Once this information is received from controller 201, task manager 209 initiates an internal counter (not shown) that is associated with remote unit 113. In the preferred embodiment of the present invention the internal counter is initially set to zero, and incremented by "1" for every output of remote unit 113 ID from queues 203. When the internal counter associated with remote unit 113 is equal to the number of serving base stations, (i.e., the ID for remote unit 113 has been emptied from all queues 203), task manager 209 outputs the location request to all serving and neighbor base stations continuing the location process. Thus, operation of queue controller 180 in accordance with the preferred embodiment of the present invention serves to limit the number of remote units simultaneously transmitting at increased power levels. By limiting the number of remote units simultaneously transmitting at increased power levels and thereby reducing system interference, unacceptably high system frame erasure rates can be reduced, resulting in decreased dropped call rates.

FIG. 3 illustrates operation of queue 203 in accordance with the preferred embodiment of the present invention. For purposes of this illustration, operation of a single queue 203 over a period of time is shown. At time t0 queue 203 is empty, indicating that no remote units utilizing the reference pilot of, or neighboring the base station associated with queue 203 require location. At time t1, queue 203 has ID1 place onto it and immediately removes ID1 from queue 203 and passes ID1 to task manager 209. In the preferred embodiment of the present invention, the removal of an ID from queue 203 initiates timer 205 associated with queue 203 which "locks" queue 203 so that no other ID's can be passed from queue 203 until timer 205 expires. In the preferred embodiment of the present invention the time that queue 203 is prevented from outputting another remote unit 113 ID is based on 1) the minimum time allowed by the system (a system operator controllable parameter), 2) the current traffic load in the reference-pilot base station and the neighboring base stations, 3) the system required quality of service parameters for the reference-pilot base station and the neighboring base stations, 4) the maximum time allowed for a remote unit location to be performed, and 5) the maximum number of entries in the queues that the remote unit ID will be placed in. In the preferred embodiment of the present invention the time that queue 203 is prevented from outputting another remote unit 113 ID is computed by the following equation:

$$T = \text{Minimum } (TM, \text{ Minimum } (Tm+a*L+b*Q, TI/M)),$$

where Tm, a, b, and TI are parameters that are defined based on specific system design and the operators requirements for quality of service and operation. In the preferred embodiment of the present invention:

Tm=Minimum Time allowed by the system in milliseconds (ms)

a is the system operator controllable scale factor for Load (in ms/unit load);

L is the computed system load;

b is the system operator controllable scale factor for Quality of service (in ms per Quality of Service parameter);

Q is the system operator controllable quality requirement (in units of an operator chosen-Quality of Service parameter);

TI is the maximum amount of time to allow for a remote unit location event (in ms); and M is the maximum number of entries in a queue that the remote unit ID will be placed in.

Continuing, at time t2, ID2 (associated with a second remote unit requiring location) is placed onto queue 203. Since the timer has not expired at time t2, ID2 remains on queue 203. At time t3 ID3 is added to queue 203. At time t4 timer 205 has expired and ID2 is removed from queue 203 and passed on to task manager 209. Timer 205 is again reset to "lock" queue 203 for the required period of time. At time t5 timer 205 has again expired and ID3 is passed from queue 203 to task manager 209 and timer 205 is again reset.

Figure 4:
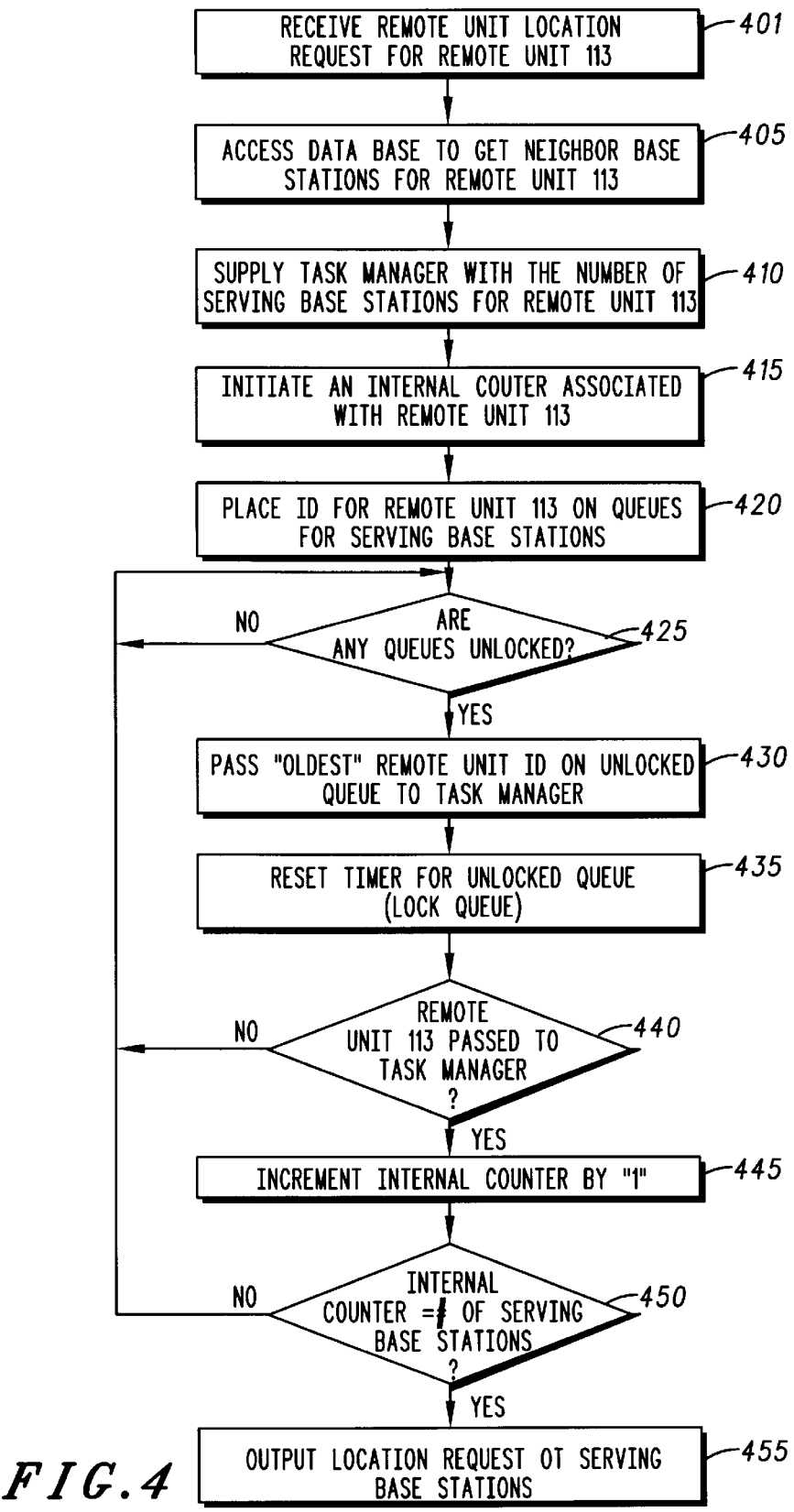
FIG. 4 is a flow chart illustrating a preferred method of operating the queue controller of FIG. 2.

FIG. 4 is a flow chart illustrating a preferred method of operating queue controller 180 of FIG. 2. The logic flow begins at step 401 where controller 201 receives a remote unit location request for remote unit 113. Next, at step 405 controller 201 accesses database 207 to determine the neighbor base stations for remote unit's 113 reference-pilot base station. Once the serving base stations are known, controller 201 supplies task manager 209 with the ID of remote unit 113 and a number corresponding to the number of serving base stations (step 410) and task manager 209 initiates an internal counter that is associated with remote unit 113 (step 415). As discussed above, the internal counter is initially set to zero, and incremented by "1" for every output of remote unit ID corresponding to remote unit 113 from queues 203.

Continuing, next at step 420 the ID for remote unit 113 is placed onto those queues 203 associated with the serving base stations. At step 425 it is determined by each queue 203 within queue controller 180 if any queues 203 are currently "unlocked." In other words, at step 425 each individual queue 203 within queue controller 180 determines whether or not an associated timer 205 has expired, and if not the logic flow returns to step 425. If at step 425 it is determined that a queue 203 is "unlocked" then the logic flow continues to step 430 where the "oldest" remote unit ID on the unlocked queue 203 is passed to task manager 209. As discussed above, each queue 203 acts as a FIFO buffer that, when instructed to release a remote unit ID, will release the remote unit ID that has existed on queue 203 for the longest period of time.

Continuing, at step 435 timer 205 associated with unlocked queue 203 is reset and the logic flow continues to step 440 where it is determined if the ID of remote unit 113 was passed to task manager 209, and if not, the logic flow returns to step 425, otherwise the logic flow continues to step 450 where the internal counter for remote unit 113 is incremented by "1." Next at step 450 task manager 209 determines if the internal counter associated with remote unit 113 is equal to the number of serving base stations. If the internal counter associated with remote unit 113 is not equal to the number of serving base stations then the logic flow returns to step 425, otherwise, the ID for remote unit 113 has been cleared from all queues 203 and the logic flow continues to step 455 where task manager 209 outputs a location request to serving base locations for location of remote unit 113.

Figure 5:
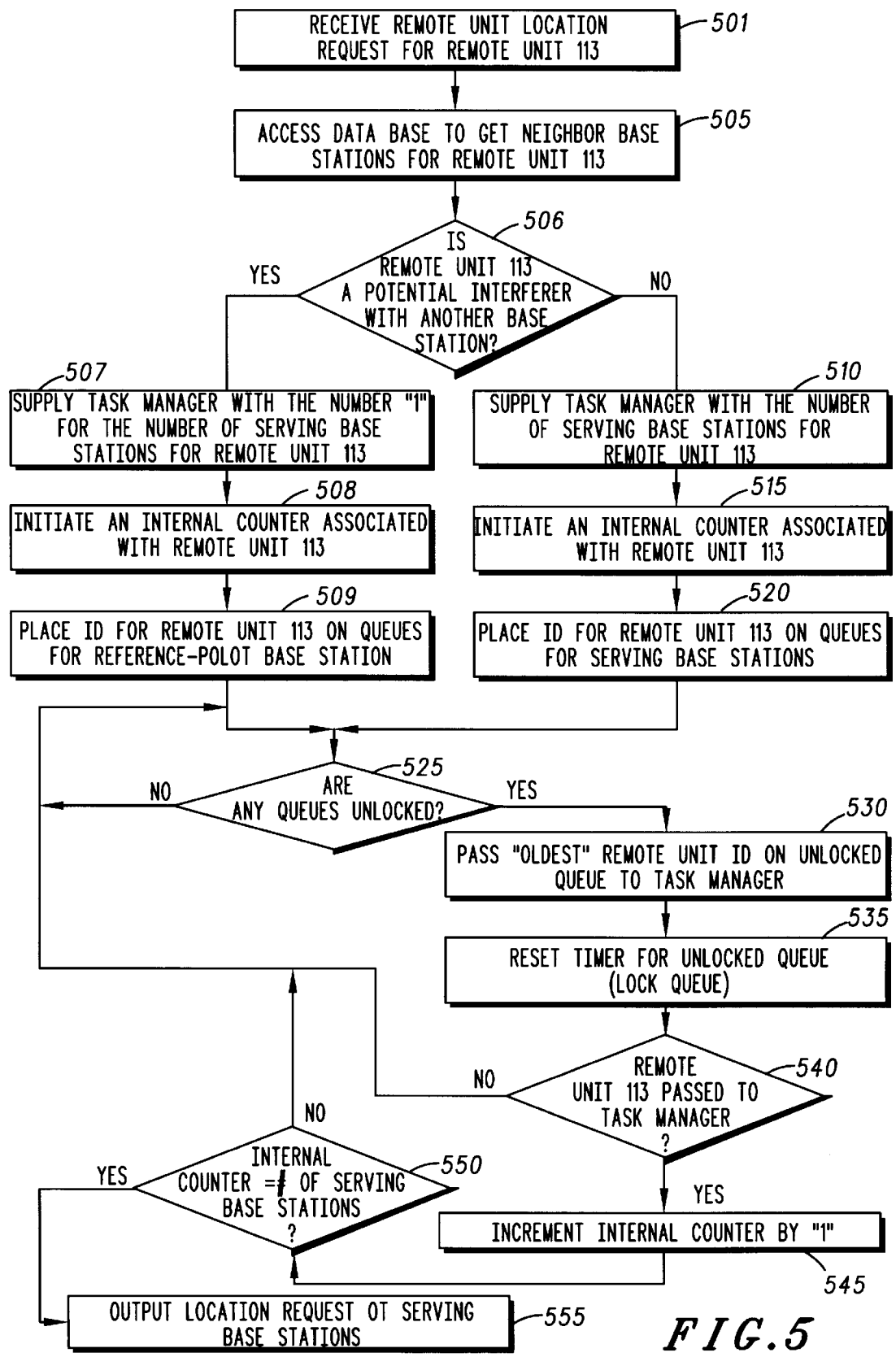
FIG. 5 is a flow chart illustrating a method of operating the queue controller of FIG. 2 in accordance with the alternate embodiment of the present invention.

FIG. 5 is a flow chart illustrating a method of operating the queue controller 180 of FIG. 2 in accordance with an alternate embodiment of the present invention. In the alternate embodiment of the present invention, queue controller 180 determines if locating remote unit 113 will negatively affect remote units served by neighbor base stations, and if not, queue controller 180 places remote unit 113 only onto the queue corresponding to the reference-pilot base station (i.e., controller 180 does not place remote unit 113 onto queues corresponding to neighbor base stations). The logic flow begins at step 501 where controller 201 receives a remote unit location request for remote unit 113. Next, at step 505 controller 201 accesses database 207 to determine the neighbor base stations for remote unit's 113 reference-pilot base station. Once the serving base stations are known, controller 201 determines if remote unit 113 will be potential interferer with a neighbor base station if transmit power is increased (step 506). In the alternate embodiment of the present invention, controller 201 determines if remote unit 113 will be a potential interferer by accessing the reference-pilot base station and determining a distance from the reference-pilot base station to remote unit 113. In the alternate embodiment, round-trip delay for a signal transmitted between remote unit 113 and the reference-pilot base station is utilized in calculating the distance between remote unit 113 and the reference-pilot base station.

Each base station within communication system 100 has an associated distance threshold, beyond which, a remote unit isdetermined to be a potential interferer to remote units served by other base stations. In the alternate embodiment of the present invention the threshold is calculated via the following equation:

$$Distance\_Threshold = A*R$$

where,

Distance$_{13}$Threshold is the maximum distance a remote unit can be from the base station before the queue controller determines the remote unit will affect neighboring base stations;

R is the engineered coverage radius of the base station; and

A is the system operator controllable scale factor (0%–100%).

If the distance between the reference-pilot base station and remote unit 113 is below a threshold, then remote unit 113 will not be a potential interferer.

Continuing, if at step 506 it is determined that remote unit 113 will not be a potential interferer with neighbor base stations then the logic flow continues to step 507 where task manager 209 is supplied with the number "1" for the number of serving base stations, and initiates an internal counter associated with remote unit 113 (step 508). At step 509 controller 201 places the ID for remote unit 113 the queue 203 associated with the reference-pilot base station and the logic flow continues to step 525.

Returning to step 506; if controller 201 determines that remote unit 113 is a potential interferer with neighbor base stations, the logic flow continues to step 510 where a number corresponding to the number of serving base stations is supplied to task manager 209 and task manager 209 initiates an internal counter that is associated with remote unit 113 (step 515). As discussed above, the internal counter is initially set to zero, and incremented by "1" for every output of remote unit ID corresponding to remote unit 113 from queues 203.

Continuing, next at step 520 the ID for remote unit 113 is placed onto those queues 203 associated with the serving base stations. At step 525 it is determined by each queue 203 within queue controller 180 if any queues 203 are currently "unlocked." In other words, at step 525 each individual queue 203 within queue controller 180 determines whether or not an associated timer 205 has expired, and if not the logic flow returns to step 525. If at step 525 it is determined that a queue 203 is "unlocked" then the logic flow continues to step 530 where the "oldest" remote unit ID on the unlocked queue 203 is passed to task manager 209. As discussed above, each queue 203 acts as a FIFO buffer that, when instructed to release a remote unit ID, will release the remote unit ID that has existed on queue 203 for the longest period of time.

Continuing, at step 535 timer 205 associated with unlocked queue 203 is reset and the logic flow continues to step 540 where it is determined if the ID of remote unit 113 was passed to task manager 209, and if not, the logic flow returns to step 525, otherwise the logic flow continues to step 550 where the internal counter for remote unit 113 is incremented by "1." Next at step 550 task manager 209 determines if the internal counter associated with remote unit 113 is equal to the number of serving base stations. If the internal counter associated with remote unit 113 is not equal to the number of serving base stations then the logic flow returns to step 525, otherwise, the ID for remote unit 113 has been cleared from all queues 203 and the logic flow continues to step 555 where task manager 209 outputs a location request to serving base stations for location of remote unit 113.

While the invention has been particularly shown and described with reference to a particular embodiment, it will be understood by those skilled in the art that various changes in form and details may be made therein without departing from the spirit and scope of the invention and it is intended that all such changes come within the scope of the following claims.

What is claimed is:

1. A method for locating a remote unit, the method comprising the steps of:
    (a) determining a first base station and a second base station currently serving the remote unit;
    (b) placing identification information regarding the remote unit onto a first buffer associated with the first base station;
    (c) placing identification information regarding the remote unit onto a second buffer associated with the second base station;
    (d) removing the identification information from the first buffer at a first time;
    (e) removing the identification information from the second buffer at a second time, wherein the second time does not equal the first time; and
    (f) locating the remote unit, wherein the step of locating the remote unit is based on identification information regarding the remote unit being removed from the first buffer and the second buffer.

2. The method of claim 1 wherein the step of removing the identification information from the second buffer at the second time comprises the step of removing the identification information from the second buffer at the second time, wherein the second time is based on a current traffic load.

3. The method of claim 1 wherein the step of removing the identification information from the second buffer at the second time comprises the step of removing the identification information from the second buffer at the second time, wherein the second time is based on a quality of service.

4. The method of claim 1 wherein the step of removing the identification information from the second buffer at the second time comprises the step of removing the identification information from the second buffer at the second time, wherein the second time is based on a maximum time allowed for the step of locating the remote unit to be performed.

5. The method of claim 1 wherein the step of locating the remote unit comprises the step of locating the remote unit by sending a command to the remote unit to increase a remote unit transmit power.

6. The method of claim 1 wherein the step of locating the remote unit comprises the step of locating the remote unit via trilateration.

7. A method for managing a location estimation of a first remote unit and a second remote unit, the method comprising the steps of:

placing identification information regarding the first remote unit onto a buffer;

placing identification information regarding the second remote unit onto the buffer;

removing the identification information regarding the first remote unit from the buffer;

locating the first remote unit, wherein the step of locating the first remote unit is based on the identification information regarding the first remote unit being removed from the buffer;

locking the buffer for a predetermined amount of time so that the identification information regarding the second remote unit cannot be removed from the buffer until the predetermined amount of time has passed;

removing the identification information regarding the second remote unit from the buffer, wherein the step of removing identification information regarding the second remote unit occurs after the predetermined amount of time has passed; and locating the second remote unit, wherein the step of locating the second remote unit is based on the identification information regarding the second remote unit being removed from the buffer.

8. The method of claim 7 wherein the step of locking the buffer for a predetermined amount of time comprises the step of locking the buffer for a predetermined amount of time, wherein the predetermined amount of time is based on a current traffic load.

9. The method of claim 7 wherein the step of locking the buffer for a predetermined amount of time comprises the step of locking the buffer for a predetermined amount of time, wherein the predetermined amount of time is based on a maximum time allowed for the step of locating to be performed.

10. The method of claim 7 wherein the step of locking the buffer for a predetermined amount of time comprises the step of locking the buffer for a predetermined amount of time, wherein the predetermined amount of time is based on a quality of service.

11. The method of claim 7 wherein the step of locating the first remote unit comprises the step of locating the first remote unit by sending a command to the first remote unit to increase the remote unit transmit power.

12. A method for locating a remote unit, the method comprising the steps of:

determining a first base station and a second base station currently serving the remote unit;

determining if a step of locating the remote unit will negatively affect remote units served by the second base station;

placing identification information regarding the remote unit onto a first buffer associated with the first base station;

placing identification information regarding the remote unit onto a second buffer associated with the second base station only if locating the remote unit will negatively affect remote units served by the second base station;

removing the identification information from the first buffer at a first time;

removing the identification information from the second buffer at a second time only if locating the remote unit will negatively affect remote units served by the second base station; and locating the remote unit, wherein the step of locating the remote unit is based on identification information regarding the remote unit not existing on the first and the second buffer.

13. The method of claim 12 wherein the step of determining if the step of locating the remote unit will negatively affect remote units served by the second base station comprises a step of determining if the remote unit is beyond a predetermined distance from the first base station.

14. The method of claim 12 wherein the step of removing the identification information from the second buffer at the second time comprises the step of removing the identification information from the second buffer at the second time, wherein the second time is based on a current traffic load.

15. The method of claim 12 wherein the step of removing the identification information from the second buffer at the second time comprises the step of removing the identification information from the second buffer at the second time, wherein the second time is based on a quality of service.

16. The method of claim 12 wherein the step of removing the identification information from the second buffer at the second time comprises the step of removing the identification information from the second buffer at the second time, wherein the second time is based on a maximum time allowed for the step of locating the remote unit to be performed.

17. The method of claim 12 wherein the step of locating the remote unit comprises the step of locating the remote unit by sending a command to the remote unit to increase a remote unit transmit power.

18. An apparatus comprising:

a controller for determining a first base station and a second base station currently serving a remote unit;

a first buffer associated with the first base station;

a second buffer associated with the second base station;

a timer for removing identification information from the first buffer at a first time and removing identification information from the second buffer at a second time, wherein the second time does not equal the first time; and locating equipment coupled to the first and the second buffers, the locating equipment serving to locate the remote unit only after identification information regarding the remote unit does not exist on the first and the second buffers.

* * * * *